US 6,725,202 B1

(12) United States Patent
Hurta et al.

(10) Patent No.: US 6,725,202 B1
(45) Date of Patent: Apr. 20, 2004

(54) TRANSACTION ACCOUNTING OF TOLL TRANSACTIONS IN TRANSPONDER SYSTEMS

(75) Inventors: Dwaine S. Hurta, Garland, TX (US); Francis B. Frazee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 185 days.

(21) Appl. No.: 09/685,900

(22) Filed: Oct. 11, 2000

Related U.S. Application Data

(60) Division of application No. 08/518,068, filed on Aug. 22, 1995, now Pat. No. 6,317,721, which is a continuation-in-part of application No. 08/420,849, filed on Apr. 10, 1995, now abandoned.

(51) Int. Cl.[7] .............................................. G06F 17/60
(52) U.S. Cl. ...................................................... 705/13
(58) Field of Search ......................... 705/13; 235/384; 342/44; 340/994

(56) References Cited

U.S. PATENT DOCUMENTS

| | | | | |
|---|---|---|---|---|
| 3,602,881 A | * | 8/1971 | Bayne ......................... 340/928 |
| 4,303,904 A | * | 12/1981 | Chasek ........................ 235/384 |
| 4,649,481 A | * | 3/1987 | Takahashi ..................... 705/10 |
| 4,739,328 A | * | 4/1988 | Koelle et al. ................. 342/44 |
| 5,053,774 A | * | 10/1991 | Schuermann ................. 342/51 |
| 5,086,389 A | * | 2/1992 | Hassett et al. ................ 705/13 |
| 5,144,553 A | * | 9/1992 | Hassett et al. ................ 705/13 |
| 5,196,846 A | * | 3/1993 | Brockelsby et al. ..... 340/10.51 |
| 5,424,727 A | * | 6/1995 | Sheih ........................... 340/928 |
| 5,471,212 A | * | 11/1995 | Sharpe et al. ................. 342/51 |
| 5,485,520 A | * | 1/1996 | Chaum et al. ................ 705/74 |
| 5,525,992 A | * | 6/1996 | Froschermeier .............. 342/42 |
| 5,663,548 A | * | 9/1997 | Hayashi et al. |
| 5,701,127 A | * | 12/1997 | Sharpe .......................... 342/42 |
| 5,710,702 A | * | 1/1998 | Hayashi et al. |

FOREIGN PATENT DOCUMENTS

| | | | |
|---|---|---|---|
| EP | 0 425 961 A2 | * | 5/1989 |
| EP | 0 577 328 A2 | * | 1/1994 |
| EP | 0 515 302 A2 | * | 9/1994 |
| EP | 0 700 019 A1 | * | 3/1996 |
| WO | WO 93/09621 | * | 5/1993 |
| WO | WO 95/10147 | * | 4/1995 |

OTHER PUBLICATIONS

No author; ATT To Install Electronic Toll Collection System in California; Apr. 1993; PR Newswire p0422NY29; dialog copy 2 pages.*

No author; Cegelec Details HAMLET 2 ETC System; Dec. 1994; Microwave Journal, p47; dialog copy 1 page.*

Blythe et al; A Short Range Road to Vehicle Microwave Communications Link for Automatic Debiting and Other RTI Services; Feb. 1991; p 248–259 and figures.*

* cited by examiner

Primary Examiner—Thomas A. Dixon
(74) Attorney, Agent, or Firm—Wade James Brady, III; Frederick J. Telecky, Jr.

(57) ABSTRACT

This invention allows a toll authority to monitor transaction numbers which are sent from a transponder (14) to an interrogator (12). By incrementing the transaction counter stored in the transponder with successful transactions the toll authority can ascertain whether accounting of a transaction has been missed (i.e., a transaction number missing from the sequence), or double-counted (i.e., two transactions with the same transaction number).

16 Claims, 2 Drawing Sheets

TRANSACTION ACCOUNTING OF TOLL TRANSACTIONS IN TRANSPONDER SYSTEMS

This application is a division of Ser. No. 08/518,068, filed Aug. 22, 1995, now U.S. Pat. No. 6,317,721, which is a continuation-in-part of Ser. No. 08/420,849, filed Apr. 10, 1995, now abandoned.

CROSS-REFERENCE TO RELATED PATENTS

The following commonly assigned patent applications are hereby incorporated herein by reference:

| Pat No./Serial No. | Filing Date | TI-Case No. |
| --- | --- | --- |
| 08/021,123 - 5701127 | February 23, 1993 | TI-17529 |
| 08/233,839 - 5471212 | April, 26, 1994 | TI-18205 |
| 08/339,091 - 5525992 | November 11, 1994 | TI-18332 |

FIELD OF THE INVENTION

This invention generally relates to recognition systems of the type which include an interrogator and a transponder, and more particularly to such a system in which the interrogator transmits an interrogation signal to the transponder in response to which the interrogator transmits back to the interrogator a response signal. The invention further generally relates to systems and methods implementing smartcards with the recognition system. In specific embodiments, the invention relates to an Automatic Vehicle Identification (AVI) type of recognition system.

BACKGROUND OF THE INVENTION

The invention will be described in the context of an Automatic Vehicle Identification (AVI) system capable of exchanging data codes between an interrogator and a transponder. The AVI field is but one environment in which the inventive concepts described herein can be applied. Systems using batteryless transponders, as well as transponders with batteries, may be used for identifying or locating objects bearing the transponders such as cattle, luggage or other items.

With respect to AVI systems, generally, the interrogator is provided in a toll booth of a toll road, parking garage or other limited access facility. The interrogator (reader) identifies passing automobiles by sending wireless interrogation signals to a transponder (tag), which would normally be a small, self-contained unit placed, for example, on the dashboard or windshield of the car. In this way the car (or other vehicle or object) can be identified in a speedy and efficient manner. Depending on the use of the system, an account associated with the driver, owner, or other designated person can be debited with an access charge. Compatibility standards for one such AVI system are set out in Title 21, Division 2, Chapter 16, Articles 1–4 of the California Code of Regulations, herein known as the Caltrans specification or Caltrans spec. The AVI equipment for toll collection typically consists of two functional elements: vehicle-mounted transponders and fixed-position interrogators.

In prior art applications there have been so-called "money on the tag" applications. In these applications the user would take his transponder to a toll agency where special equipment could program data, representing a certain amount of money, into the transponder. The main disadvantage to this prior art application is the loss of privacy in that the user would have to take his transponder to another person, that person typically being the tollway agent. See e.g., U.S, Pat. No. 5,144,5,53 to Hassett et al. This prior art application also has a substantial disadvantage in that it does not provide the convenience of the smartcard.

Within the prior art of payment systems, it is known to use "smartcards" for exchanges of goods and services. Smartcards are generally about the size of a credit card and have a microprocessor embedded in them. The smartcard can generally read, write and store information. In a typical application, the user will access an automated machine through which data representing an amount of money may be written into the smartcard memory. Each time a good or service is purchased using the smartcard, the data in the smartcard memory is debited to reflect the amount of the transaction. An advantage of using smartcards, in addition to potential increases in user privacy, is the potential to eliminate point-of-sale equipment. Smartcards have been implemented, or are anticipated to be implemented, in numerous applications: pay phones, automated banking, automated vending and the like. Automated machines for storing data in smartcards might be placed in post offices or stores.

In prior art AVI applications using smartcards, dual gantry systems are used. In the dual gantry system the transponder smartcard access is begun at a first gantry. Because of the slowness of the transponder smartcard interface the transaction must be completed at a later gantry. The disadvantages of such a prior system is the cost associated with construction of multiple gantries per toll plaza. Another disadvantage of such a system is the complexity of coordinating actions between the first gantry and the later gantry.

SUMMARY OF THE INVENTION

This invention allows a user to have a smartcard and a smartcard-based transponder. This smartcard-based transponder can accept money from the smartcard. The amount transferred from the smartcard can be stored in the transponder memory. At a toll plaza, a toll amount can be subtracted within a short period of time, so that a vehicle bearing the transponder will not pass through an interrogator read zone (the zone in which the transponder and interrogator may perform RF communications) before an appropriate toll amount can be decremented from the amount stored within the transponder.

BRIEF DESCRIPTION OF THE DRAWINGS

In the drawings.

Corresponding numerals and symbols in the different figures refer to corresponding parts unless otherwise indicated.

DETAILED DESCRIPTION

Figure 1:
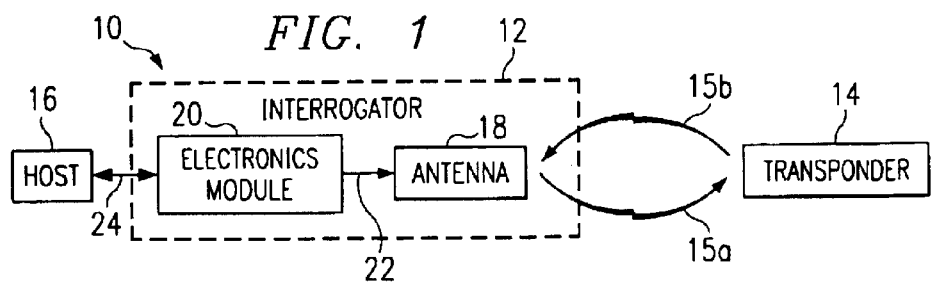
FIG. 1 is a block circuit diagram of an interrogator and transponder arrangement according to the present invention.

FIG. 1 shows a block diagram of an AVI system 10 in which an interrogator 12 communicates with a remote transponder 14 by transmitting an interrogation signal 15a to the transponder 14 in response to which the interrogator 12 transmits back to the interrogator 12 a response signal 15b containing a transponder-unique identifying code (ID). In a typical AVI system, the interrogator 12 will convey this information into a host computer (host) 16 for maintaining accounting information with respect to the transponder 14 and the smartcard 66 (see FIG. 4) associated with the transponder 14.

Figure 2:
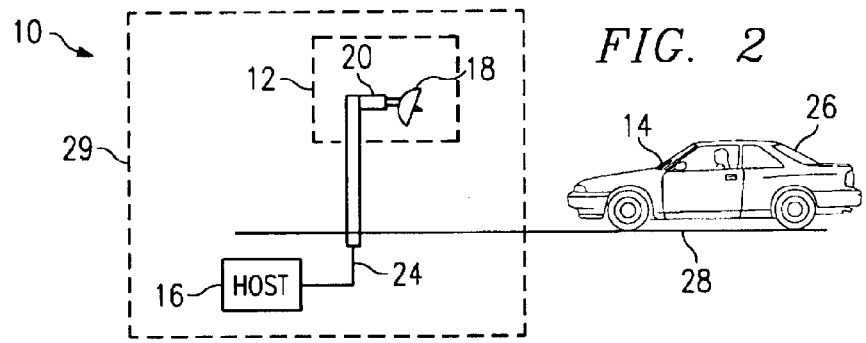
FIG. 2 is a generalized side elevation of a typical installation of an Automatic Vehicle Identification (AVI) System in accordance with FIG. 1.

Referring to FIG. 2, traffic lanes 28 are located at a traffic control point such as a toll plaza 29. Each traffic lane 28 has an associated interrogator 12. Each interrogator 12 initiates and maintains communication via an RF data link with transponders 14 carried on vehicles 26 travelling within the interrogator's 12 associated lane 28. The interrogators 12 may have unique internal electrical parameters such as interrogator lane position, interrogator control parameters, and interrogator reference frequency. The role of the interrogator 12 in this application is: to trigger or activate a transponder 14, to interrogate or poll the transponder 14 for specific information, and if a valid data exchange has taken place, to acknowledge that fact to the transponder 14. As shown in FIGS. 1–2, the interrogator 12 has an antenna 18 which is preferably mounted above the roadway. Interrogator electronics 20 are connected to the antenna 18 by suitable cable, such as for example an RF coax 22.

The interrogator 12 communicates in a wireless fashion with the transponder 14 by sending on/off keyed modulated signals to the transponder 14. Interrogator 12 then sends a continuous wave RF signal to the transponder 14. The transponder 14 may respond to the interrogator 12 by backscatter modulating the continuous wave RF signal such as described in U.S. Pat. No. 4,739,328 by Koelle, et al. Details of the communication between the interrogator 12 and the transponder 14 will be further described herein. The function of the optional host 16 is to control the operations of the interrogator 12 and the peripheral functions of the toll plaza. Such peripheral functions might include operation of traffic control gates and other lane enforcement equipment such as cameras and traffic lights. Still other peripheral functions might include communications between interrogators 12 and communications with a central office computer (not shown) that might maintain accounting information. Connection 24 between the interrogator 12 and the host 16 as shown in FIG. 1 may be an ethernet, token ring, RS232, RS422 or other connection.

FIG. 2 shows a side view of a typical AVI system 10 installation. In this figure a vehicle 26 travels on a vehicle lane 28 and approaches the antenna 18. A transponder 14 is located on or within a vehicle 26. Preferably the transponder 14 is mounted to the vehicle front window. In certain applications such as in unusually large vehicles other locations such as on a truck's bumper might be appropriate to reduce variation in height of transponder 14. As shown in the figure, the vehicle 26 carrying the transponder 14 approaches the interrogator 18 at the toll plaza 29. Further details regarding the communication between the transponder 14 and the interrogator 12 will be discussed herein. The components of the interrogator 12 and transponder 14 will also be discussed in greater detail.

Figure 3:
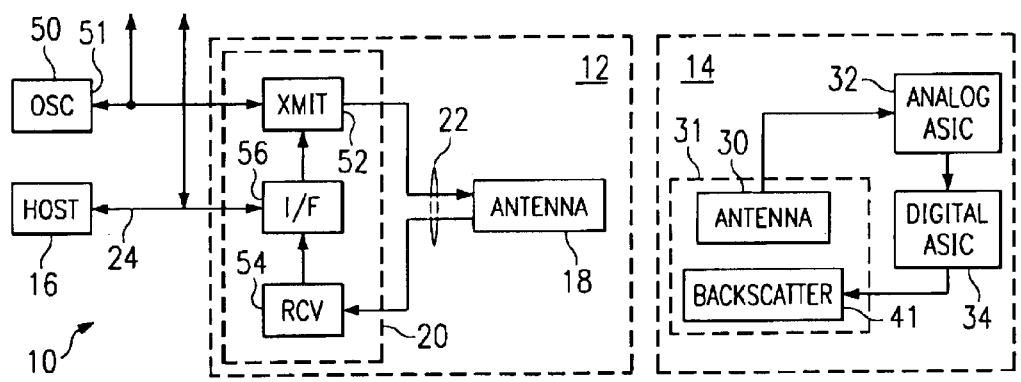
FIG. 3 is a block circuit diagram of the transponder and interrogator arrangement usable in the systems of FIGS. 1–2.

FIG. 3 provides a block diagram of the major components of the AVI system 10. First, a transponder 14 will be described with reference to FIG. 4 together with FIGS. 2 and 3. The AVI system 10 preferably comprises directional antennas 18, each antenna 18 focused on an associated vehicle lane 28. A vehicle 26 or vehicles 26 may travel on each lane 28, each vehicle 26 carrying one or more transponders 14. Each transponder 14 preferably comprises: an antenna 30, an analog or analog/digital ASIC 32, a digital ASIC 34, and a modulated reflector 41. Antenna 30 and modulated reflector 41 may form a single integrated antenna 31. Preferably ASIC 32 and ASIC 34 are integrated as a single ASIC.

With further reference to FIGS. 3, the transponder antenna 30 is operable to receive RF transmissions from the interrogator 12. The analog ASIC 32 converts a signal supplied by the transponder antenna 30 to a voltage which upon exceeding a threshold activates the transponder 14. Preferably, the analog ASIC 32 senses high frequency modulation present upon the signal from the transponder antenna 30 and will only activate the transponder 14 upon presence of that specific modulation frequency. In this way, the transponder is relatively immune to being awakened by spurious RF transmissions not originating in the interrogator 12, but only is activated when a particular frequency is transmitted by the interrogator 12. The voltage threshold may be adjustable.

Referring still to FIG. 3, the analog ASIC 32 and digital ASIC 34 typically process the interrogation signal received from the transmitter 52 and formulate the necessary reply data. The digital ASIC 34 then provides a formatted reply data stream to the modulated reflector 41. This ASIC 34 might be a simple digital system using a fixed format, or a more versatile digital processing system which can incorporate a number of options. Many functions can be envisioned for the ASIC 34 to accomplish. Examples of such functions include but are not limited to: data storage, data exchange history, and battery capacity warning. The modulated reflector 41 is modulated by changing its apparent wave length, preferably between one fourth and one half the carrier wave length. When the apparent wave length of the modulated reflector 41 is ½, then the antenna 30 reflects a large portion of the incident carrier energy. When the modulated reflector 41 has an apparent length of ¼, it reflects very little of the incident carrier. As is well known in the art, a switching of an antenna between ½ and ¼ can be accomplished by connecting or disconnecting two ¼ stubs. For the described embodiment, the change in Reflective Cross Section (RCS) is preferably between 45 $cm^2$ and 100 $cm^2$. By varying the RCS according to the specified format, data is sent from the transponder 14 to the interrogator 12. The transponders 14 are typically self-contained on a small credit card size assembly that is completely portable. Preferably an internal battery is provided to give operating power to the transponder 14. Alternatively the transponder 14 might gain its operating power directly from the RF signal as set forth in commonly assigned U.S. Pat. No. 5,053,774 to Schuermann.

Now that the components of the transponder 14 have been generally described, with further reference to FIG. 3, a preferred embodiment interrogator 12 will be generally described. The interrogator 12 is located at a specific point where data exchange is desired, such as a toll plaza. The AVI system 10 may include a common reference oscillator 50 which generates at its output 51 a reference carrier wave for coordination between interrogators 12. Each interrogator 12 has a directional antenna 18 and a transmitter 52, which transmit a trigger signal of sufficient field strength at a pre-selected distance to trigger or activate a transponder 14 being carried in a vehicle 26 in the interrogator's associated vehicle lane 28.

Figure 4:
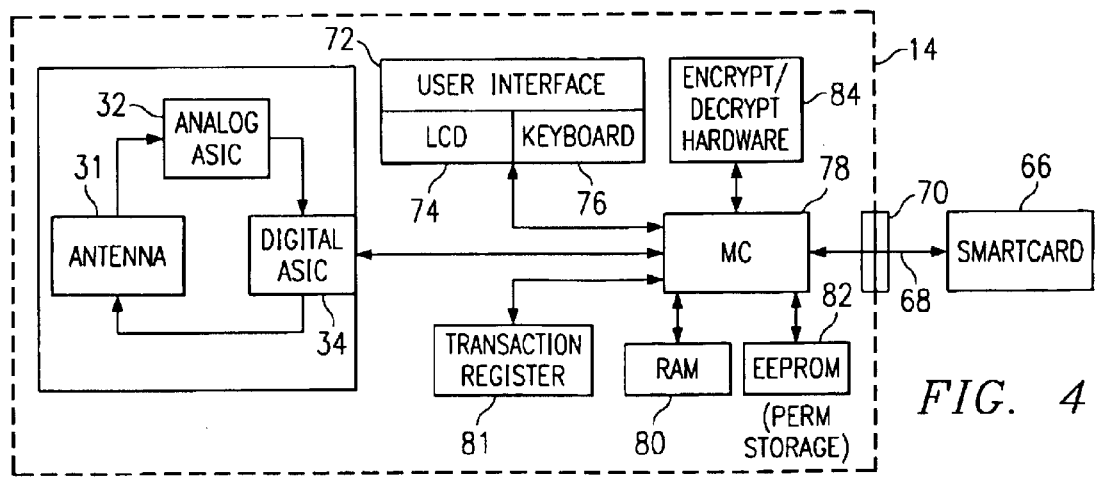
FIG. 4 is a more detailed block circuit diagram of the transponder of FIG. 3, depicting the transponder's internal components and a smartcard operable to communicate with the transponder.

FIG. 4 illustrates, in block diagram form, a preferred embodiment of a transponder 14 in communication with the smartcard 66 through interface 68. Preferably the smartcard 66 will be provided by the system user. The smartcard 66 will slip into socket 70 so that communication may be effected through interface 68. Transponder 14 comprises a user interface 72, which in turn has an LCD 74 and a keyboard 76. The LCD 74 is preferably used to show the user the amount of money stored in the transponder 14 or the amount last debited. After the microcontroller 78 of the transponder 14 "authenticates" that the smartcard 66 is compatible with the transponder 14 application, the microcontroller 78 may optionally begin an "authorization" process by which the user may input a PIN through the keyboard 76. Other "authorization" processes may be used to assure that the smartcard 66 may permissibly be used with the transponder 14. Upon entering of the PIN, the microcontroller 78 of the transponder 14 will compare this PIN to an encoded identification value stored on the smartcard 66 and transmitted to the microcontroller 78 as a part of the smartcard certificate before allowing any money or other data to be downloaded from the smartcard 66. Preferably this authentication and authorization process will be effected through the interface 68, which is preferably a serial interface.

In an embodiment of the invention the smartcard 66 would transfer data representing an amount that is preferably two to three times the amount of a typical toll in the transponder's 14 intended environment. This transaction will generate information representing such things as the amount of the transaction, the toll agency, the smartcard identification, and other information.

Initially, information is generated by the smartcard 66 and stored in the transponder 14. The information actually generated by the smartcard 66 is called a smartcard certificate. This smartcard certificate will generally comprise: 1) a portion of unencrypted data representing location, time, smartcard number, or other information necessary for the system administrator to ensure that a valid transaction took place; and 2) an encrypted portion comprising command and other information. If the microcontroller 78 is able to successfully read this encrypted portion, the certificate is then stored in the transponder 14 under control of the transponder microcontroller 78. This smartcard certificate may be stored in the RAM 80 or the EEPROM 82. The advantage of storing in the EEPROM is the permanent non-volatile characteristics of storage within EEPROM.

For security and privacy reasons, an encrypter/decrypter 84 is provided in communication with microcontroller 78. The encrypter/decrypter 84 will encrypt and decrypt data which is transferred to and from the smartcard 66. This will prevent individuals from being able to circumvent use of the smartcard by tampering with the transponder 14 so as to increase the amount of money stored in the transponder and also from being able to transfer an apparently larger amount of money back into the smartcard 66 from the transponder 14. The transponder 14 will preferably run on batteries, but may also be connected into the automotive or other system main power supply. The transponder 14 also may be integrated into a vehicle or other system.

The smartcard 66 may be taken by the user to a machine similar to automatic teller machines (ATM) into which money may be placed and value units representing that same amount of money or another amount of money may be placed in the smartcard 66. Alternatively, money may be debited from an account or charged to a credit account and the data representing that amount of money or another amount of money may be placed in the smartcard 66. Once this data has been placed in the smartcard 66 from the external card machine, then the user may take the smartcard with him and use it in conjunction with his transponder 14 or perhaps in other applications using compatible smartcards 66.

The advantage of using a smartcard 66 in this manner is that it gives the user a certain degree of privacy not available in prior art systems. In systems where an external machine such as an ATM is used for instance, the money (cash) may be placed into the machine directly and no identification of the user would be necessary.

In a typical toll transaction sequence, upon entering a toll area, the toll booth interrogator 10 will interrogate the transponder 14. The interrogation will begin with an approach, or wake-up, message to alert the transponder 14 that it is in the toll area. The interrogator 10 then sends a presentation request comprising gantry identification and location detail, acceptable contracts or payment methods (credit card, debit card, or other payment systems). In the presentation response, the transponder 14 informs the interrogator 10 of its identity, the payment method it wishes to use, the vehicle classification information, an authorization code, and similar information, a random number, and the account authorization Message Authentication Code (MAC), which is an encrypted confirmation code using an encryption method such as the Data Encryption Standard (DES).

Next the interrogator 10 sends to the transponder 14 a transaction request, which comprises the fee to be charged, date and time, and a cipher code, which is an encrypted representation of the random number sent from the transponder 14 to the interrogator 10 during the presentation response. At this time the transponder 14 unencrypts the code, and if the code matches the random number sent during the presentation response, the authorization is complete.

The transponder 14 will thereupon send a transaction response comprising a status code, a payment ID, and an encrypted MAC to act as a receipt for the transaction. The transaction response will either be the transponder certificate or an error code explaining why a transponder certificate could not be generated and the transaction failed.

The interrogator 10 will process that information and send back a transaction receipt to terminate the transaction. The transponder 14 may then find an opportune moment to subtract from the running total of value units stored in the transponder memory 80,82. Alternatively in a system such as the Kansas Turnpike, where the amount of the toll is proportional to the distance traveled on the toll road, perhaps upon entering the toll facility nothing more than the location code of the entrance point will be stored in the transponder 14. In this scenario, upon approaching the toll area the transponder 14 will report its entry point to the interrogator 10. The interrogator 10 will then compute the proper toll and transmit it back to the transponder 14. At this time, the toll amount will be subtracted from the running total stored within the transponder 14 as described above. In the toll booth transaction, two certificates are transmitted from the transponder 14 to the interrogator 10.

Transferring both the smartcard certificate and the transponder certificate from the transponder 14 to the interrogator 10 allows the managing entities to keep a "shadow balance" or a running count of how many times a given smartcard 66 has been debited and that the amount of money charged on a given smartcard is equivalent to the money put into that same smartcard 66. This would not necessarily violate the users' privacy, since it is not a requirement that a name ever be associated with a given smartcard 66. Each transaction will have a transaction number associated with it so that when an accounting is made of all the transactions, missing transactions can be easily identified.

This method of tracking transactions using transaction numbers, proceeds as follows. Initially, an initial transaction count is established in a transaction register of said transponder 14. The interrogator 12 subsequently transmits an interrogation and thereafter the responder 14 sends a response. Preferably this response would also comprise data representing the value of the transaction count that is presently stored in said transaction register. The transaction register would preferably operate under control of the transponder microcontroller 78. Alternatively the transponder 14 could transmit the transaction count to the interrogator 12 in a separate transmission.

In this embodiment, the value stored in the transaction register will be incremented or otherwise modified each time a successful interrogation and response transaction is completed between the transponder 14 and an interrogator 12, more specifically, the value stored in the transaction register might only be updated when a toll is debited from the transponder, thus a new receipt number will only be generated to accord with a single toll transaction. The modification of the transaction register might be effected by command from the interrogator to the transponder upon an acknowledgement signal from said interrogator indicating that a successful interrogation and response cycle had been completed.

One application of this transaction number data would be to submit all or some transactions from the interrogator to a host or processing unit for analysis. By this method the processing unit can compile the submitted transponder responses along with their associated transaction numbers or receipt numbers. In the event of a double inclusion of a certain number or in the event of a certain receipt number being skipped, it is likely that an error or a fraud has been committed.

By transmission of the approach message, presentation request, transaction request, transaction response, and transaction receipt, and handling the updating of information directly between the transponder memory 80, 82 and the interrogator 10 instead of directly between the smartcard 66 and the interrogator 10, the problems associated with effecting data transfers within a communications window during which the transponder lies within a interrogators beam is overcome. By the extensive security, protocols, and handshaking between the interrogator 10 and the transponder 14, security concerns associated with traditional "money on tag" applications have been largely overcome.

The transaction speed is vastly improved in this embodiment relative to systems in which the smartcard 66 communicates directly with the interrogator 10 through the transponder modulator and demodulator. This is because most smartcards 66 have slow, standard serial interfaces. It is important that the data transfer time between the interrogator 10 and the transponder 14 not depend on the access time for retrieving and storing data from and to the smartcard 66. By keeping the data temporarily within the memory of the transponder, the memories 80, 82 of the transponder 14, the slower communications between the transponder 14 and the smartcards 66 may take place after the communication is with the toll plaza is complete.

In one embodiment the entire value stored within the smartcard 66 may be transferred to the transponder 14. Upon removal of the smartcard 66, any remaining money could be transferred back into the smartcards 66. This is Where the importance of encryption of the data stored within the transponder 14 comes into play. It is very desirable that an individual not be able to manipulate the data which is stored in the transponder 14 and then upon transferring the money back from the transponder 14 to the smartcard 66, a larger amount of money does not appear because of tampering. The role of the encrypter 84 is to encrypt this data.

Preferably an entire data transaction is accomplished within 10 milli-seconds. During this time the transponder 14 will respond to an interrogation signal from the interrogator 10. The toll is determined and transmitted to the transponder 14. The certificates are generated and the proper amount is debited from the running total within the transponder 14. Where this invention preferably allows these transactions to be performed within approximately 10 milliseconds, prior art smartcard transponder applications typically took 300 to 500 milliseconds. Once this transaction has been completed, the transponder 14 may update the smartcard 66 when the criticality of the communication speed is not as great, i.e., when the transponder is no longer within the interrogator 10 reading range.

The smartcard 66 could be interchanged between users and between applications. Thus this application overcomes the problem of storing money actually and directly on the transponder 14, which has a disadvantage of its lack of mobility in that the transponder would generally be stored in a single automobile and would not be able to be used in other applications. In the current embodiment, a user may take his smartcard 66 and use it with his transponder 14 for tolling applications, as well as perhaps in vending machines, public pay telephones, or other applications.

This embodiment further has the advantage of increased privacy and flexibility with respect to "money on tag" systems in which the money alone is stored directly on the tags. In such prior systems, special agents are required with special machines to input money into the transponder 14. In this embodiment, the transponder 14 is loaded with money from the smartcard 66, which may have money placed in it through automatic machines similar to automatic teller machines (ATM).

Figure 5:
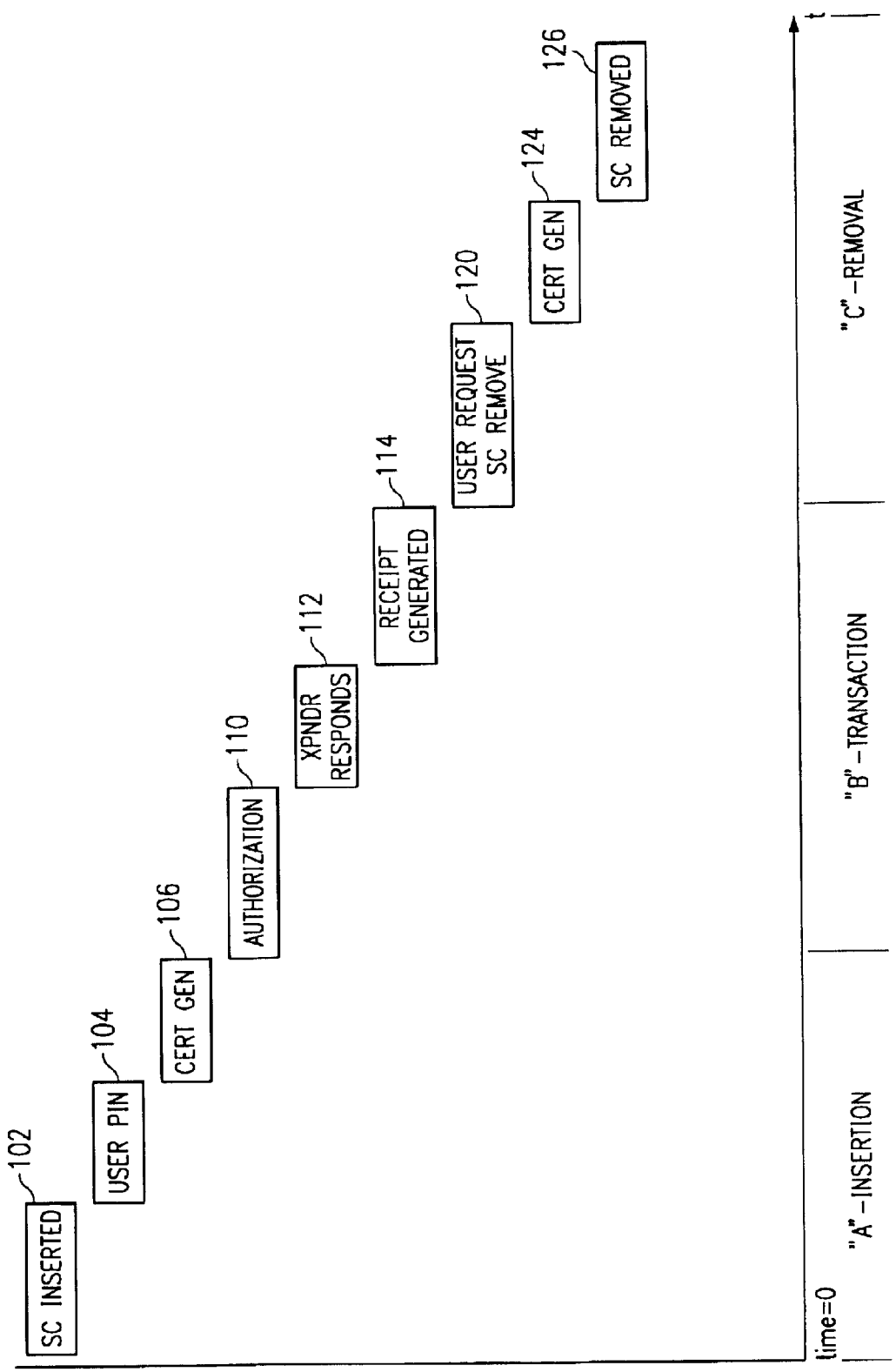
FIG. 5 is a generalized timing diagram describing the method of using the preferred embodiment transponder in a smartcard application.

FIG. 5 gives a broad-level timing diagram for an embodiment of this invention. The timing may be considered as being divided into 3 distinct phases. The first phase, phase "A"—Insertion describes the part of the user operation when the user inserts the smartcard 66 into the transponder 14. This step is designated as block 102 in FIG. 5.

Next the user may optionally input a personal identification number (PIN) into the keyboard 76. This is designated as block 104. Upon the user's entrance of the PIN, the microcontroller 78 of the transponder 14 will compare this PIN to an encoded identification value stored on the smartcard 66 and transmitted from the smartcard to the microcontroller 78 as a part of the "authorization" process. Depending on the desired level of security this authorization process may be foregone.

At block 106 the smartcard 66 generates a smartcard certificate comprising: 1) a portion of unencrypted data representing location, time, smartcard number, value units representing the amount of money stored on the smartcard, and other information necessary for the system administrator to ensure that a valid transaction took place; and 2) an encrypted portion comprising command and other information. If the microcontroller 78 is able to successfully read this encrypted portion, the certificate is then stored in the transponder 14 under control of the transponder microcontroller 78. The microcontroller 78 receives this value and generates a certificate storing this certificate in either RAM 80 or EEPROM 82. Once this has been done, the transponder 14 is ready to undergo transactions with an interrogator 12.

The transactions phase is shown as phase "B" in FIG. 5. This phase is entered when the transponder enters a toll zone as shown in block 110. The interrogation will begin with an approach, or wake-up, message to alert the transponder 14 that it is in the toll area. The interrogator 10 then sends a presentation request comprising gantry identification and location detail, acceptable contracts or payment methods. The transponder 14 then in its presentation response informs the interrogator 10 of its identity, the payment method it wishes to use, the vehicle classification information, an authorization code, and similar information, a random number, and the account authorization Message Authentication Code (MAC), which is an encrypted confirmation code using an encryption method such as the Data Encryption Standard (DES). Next the interrogator 10 sends to the transponder 14 a transaction request, which comprises the fee to be charged, date and time, and a cypher code, which is an encrypted representation of the random number sent from the transponder 14 to the interrogator 10 during the presentation response. At this time the transponder 14 unencrypts the code, and if the code matches the random number sent during the presentation response, the authorization is complete.

At block 112 the transponder 14 will provide a transaction response comprising a status code, a payment ID, and an encrypted MAC to act as a receipt for the transaction. The transaction response will either be the transponder certificate or an error code explaining why a transponder certificate could not be generated and the transaction failed.

The interrogator 10 will process that information and send back a transaction receipt to terminate the transaction (block 114). The transponder 14 may then find an opportune moment to subtract from the running total of value units stored in the transponder memory 80,82. The microcontroller 78 performs mathematical operations to make this deduction and again stores the information in the RAM 80 or the EEPROM 82. Steps 110-118 may be repeated as long as the amount of currency in the tag has not been subtracted below its minimum balance.

Phase "C" designates the removal of the smartcard upon the user request at block 120. At this time any amount of money remaining in the transponder is preferably credited back to the smartcard 66 via the interface 68. This transfer may preferably be encrypted. The money in the smartcard 66 is updated by generation at block 124 of another certificate and the storage of the certificate in the smartcard 66. The smartcard may now be removed from the transponder 14 at block 126.

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Frequency shift keyed (FSK) modulation is envisioned as a possible data modulation scheme, as well as pulse-pause modulation, amplitude shift keying (ASK), quadrature AM (QAM) modulation, phase shift keying (PSK), quadrature phase shift keying (QPSK), or any other modulation. Different types of multiplexing such as time or frequency modulation might be effected to avoid cross-signal interference. Modulation might be effected by back-scatter modulation, by active modulation of a carrier, or by another method.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of tracking transactions in a system comprising an interrogator and a transponder having a transaction register, the method comprising the steps of:

providing an interrogator and a transponder having a transaction register remote from said interrogator;

providing a smartcard having data thereon and removably couplable to said transponder;

coupling said smartcard to said transponder to set data including a transaction count from said smartcard into said transaction register of said transponder;

sending an interrogation from said interrogator to said transponder when said transponder is within range of said interrogator to receive said interrogation above a predetermined minimum threshhold to commence operation of said transponder;

sending a response to said interrogator from said transponder in response to said interrogation;

modifying at said transponder said transaction count stored within said transaction register in response to an indication of a predetermined interrogation and response transaction being completed between said transponder and interrogator and communicated by said interrogator to said transponder; and storing said modified transaction count from said transaction register in said transponder in said smartcard.

2. The method of claim 1 further including the step of removing said smartcard from said transponder after said step of storing said modified information.

3. The method of claim 1 wherein said step of modifying is performed when said interrogation is below said predetermined minimum threshold after having been above said predetermined minimum threshold.

4. The method of claim 2 wherein said step of modifying is performed when said interrogation is below said predetermined minimum threshold after having been above said predetermined minimum threshold.

5. The method of claim 1 wherein said smartcard includes, as a portion of said data, user identifying data, further including keying in at said transponder user identifying data for comparison with said user identifying data in said smartcard and terminating operation of said system in response to a non-comparison.

6. The method of claim 2 wherein said smartcard includes, as a portion of said data, user identifying data, further including keying in at said transponder user identifying data for comparison with said user identifying data in said smartcard and terminating operation of said system in response to a non-comparison.

7. The method of claim 3 wherein said smartcard includes, as a portion of said data, user identifying data, further including keying in at said transponder user identifying data for comparison with said user identifying data in said smartcard and terminating operation of said system in response to a non-comparison.

8. The method of claim 4 wherein said smartcard includes, as a portion of said data, user identifying data, further including keying in at said transponder user identifying data for comparison with said user identifying data in said smartcard and terminating operation of said system in response to a non-comparison.

9. A method of tracking transactions in a system comprising an interrogator and a transponder having a transaction register, the method comprising the steps of:

provㅇiding an interrogator and a transponder having a transaction register;

providing a smartcard having data thereon which is removably couplable to said transponder for transmission of said data to said transponder and receipt of data from said transponder;

coupling said smartcard to said transponder to set data including a transaction count from said smartcard into said transaction register of said transponder;

sending an interrogation from said interrogator to said transponder when said transponder is within range of said interrogator to receive said interrogation at at least a predetermined minimum threshhold to commence operation of said transponder;

sending a response to said interrogator from said transponder in response to said interrogation;

modifying at said transponder said transaction count stored within said transaction register in response to an indication of a predetermined interrogation and response transaction being completed between said transponder and interrogator and communicated by said interrogator to said transponder; and storing said modified transaction count from said transaction register in said transponder in said smartcard.

10. The method of claim 9 further including the step of removing said smartcard from said transponder after said step of storing said modified information.

11. The method of claim 10 wherein said step of modifying is performed when said interrogation is below said predetermined minimum threshold after having been above said predetermined minimum threshold.

12. The method of claim 11 wherein said step of modifying is performed when said interrogation is below said predetermined minimum threshold after having been above said predetermined minimum threshold.

13. The method of claim 12 wherein said smartcard includes, as a portion of said data, user identifying data, further including keying in at said transponder user identifying data for comparison with said user identifying data in said smartcard and terminating operation of said system in response to a non-comparison.

14. The method of claim 13 wherein said smartcard includes, as a portion of said data, user identifying data, further including keying in at said transponder user identifying data for comparison with said user identifying data in said smartcard and terminating operation of said system in response to a non-comparison.

15. The method of claim 14 wherein said smartcard includes, as a portion of said data, user identifying data, further including keying in at said transponder user identifying data for comparison with said user identifying data in said smartcard and terminating operation of said system in response to a non-comparison.

16. The method of claim 15 wherein said smartcard includes, as a portion of said data, user identifying data, further including keying in at said transponder user identifying data for comparison with said user identifying data in said smartcard and terminating operation of said system in response to a non-comparison.

* * * * *